(No Model.)
C. KILLGORE.
MACHINE FOR COMPRESSING DRY AND PLASTIC MATERIALS.
No. 260,578. Patented July 4, 1882.
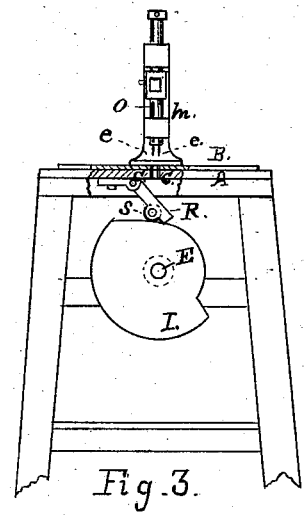
Fig. 3.
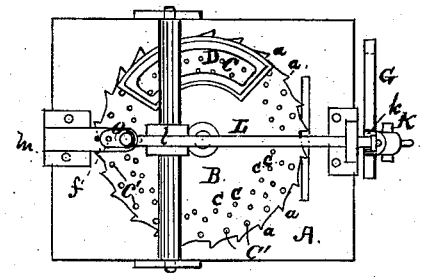
Fig. 1.
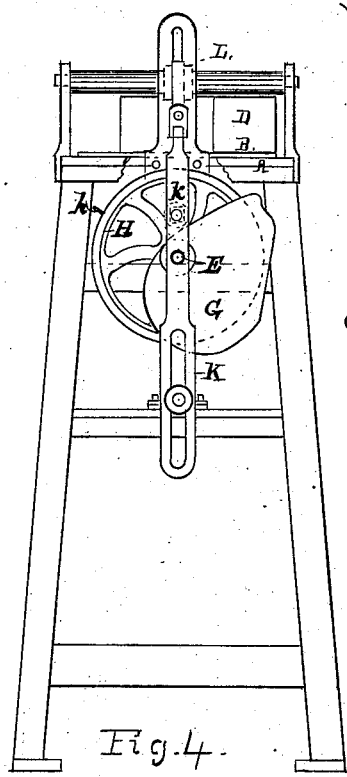
Fig. 4.
Fig. 5.
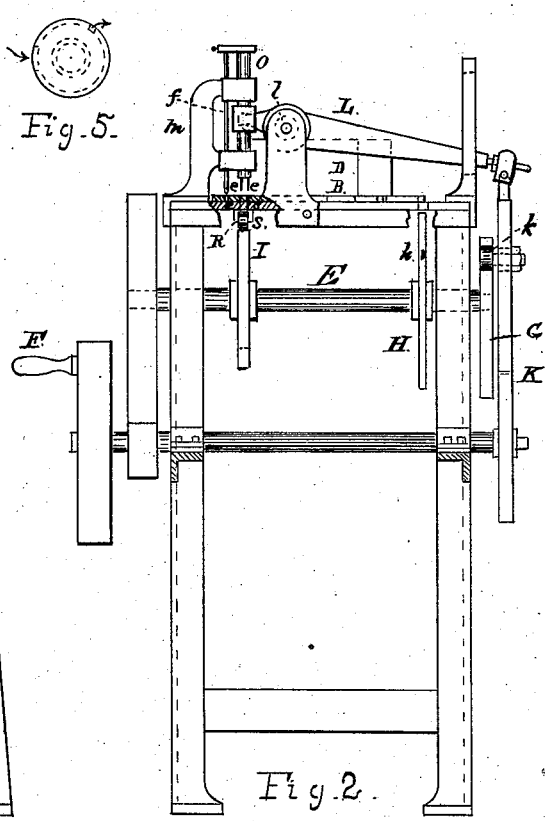
Fig. 2.
WITNESSES:
C. Sedgwick
J. H. Scarborough
INVENTOR.
C. Killgore
By Munn & Co
attorneys
N. PETERS, Photo-Lithographer, Washington, D. C.

UNITED STATES PATENT OFFICE.

CHARLES KILLGORE, OF UTICA, NEW YORK, ASSIGNOR TO IDA W. KILLGORE, OF SAME PLACE.

MACHINE FOR COMPRESSING DRY AND PLASTIC MATERIALS.

SPECIFICATION forming part of Letters Patent No. 260,578, dated July 4, 1882.

Application filed November 16, 1881. (No model.)

*To all whom it may concern:*

Be it known that I, CHARLES KILLGORE, of Utica, in the county of Oneida and State of New York, have invented a new and useful Improvement in Machines for Compressing Dry and Plastic Materials, of which the following is a full, clear, and exact description.

My improvements relate to machines for compressing medicated and other lozenges from dry powder, buttons from plastic materials, and for other work of similar character.

The object of my invention is to obtain automatic and rapid action; and it consists in the combined mechanism hereinafter described and claimed.

Reference is to be had to the accompanying drawings, forming part of this specification, in which similar letters of reference indicate corresponding parts in all the figures.

Figure 1 is a plan view of the machine. Fig. 2 is a side view, partially sectional. Fig. 3 is a front elevation, partially sectional. Fig. 4 is a rear elevation, and Fig. 5 shows the jacketed hopper used with plastic material.

A is a metal bed-plate supported on a suitable frame.

B is a circular disk, pivoted at its center to turn on the bed, formed with ratchet-teeth $a$ on its edge, and having near its edge suitable apertures, $c\ c'$, of the form and size required in the compressed article. The bed A also has openings to correspond with apertures $c$.

D is a hopper fixed on bed A, with its open bottom over the openings $c$ in the disk.

E is a shaft sustained on the frame beneath bed A, and revolved by gearing or other connections from a driving-shaft.

G is a cam. H is a wheel with a single tooth, $h$, and I is a cam, all fixed on the shaft E.

O is a plunger fitted for vertical movement in a head, $m$, above the disk B, and carrying at its lower end dies $e$ for entering the openings $c$.

$f$ is a small rod with a tapering end, fitted for movement in head $m$ with the plunger O, and entering the outer apertures in disk B.

L is a lever hung above the bed, connecting by its inner end with the plunger, and at its outer end to a rod, K, in a slot of which is a bolt carrying a roller, $k$, that rests on the cam G. The slot is to allow the adjustment of the roller to vary the pressure.

On the under side of bed-plate A is a hinged trap, S, the upper side of which is recessed to the shape required for the lower face of the mold, which the trap forms in connection with the apertures $c$.

On the under side of the trap is a projection and roller, R, for contact with the cam I, whereby the trap is raised and retained.

In operation the material is placed in the hopper and enters the apertures $c$ in disk B as they pass successively beneath. The disk is rotated intermittently the distance of one tooth at a time by the tooth on wheel H. The plunger O is brought down by the action of cam G on rod K and lever L while the disk is at rest, and the rod $f$ first enters one outer aperture, $c'$, and holds the disk, while the dies $e$ follow and compress the material in the apertures $c$. The end of rod $f$, being tapering, serves to bring the disk to its place in case it is slightly out. The cam G is shaped to release the pressure after compression, at which moment the trap S is allowed to fall by withdrawal of cam I, and the cam G then giving a further compression, the lozenge or other compressed article is pushed out, after which the plunger rises and the disk is turned again. The trap is essential for use in compressing articles having rounded faces.

For compressing plastic materials requiring to be kept warm, I use the hopper shown in Fig. 5, which has a jacket, to which steam will be supplied in any suitable manner.

Having thus described my invention, I claim as new and desire to secure by Letters Patent—

1. In a compressing-machine, the combination, with the bed A, the wheel H, provided with a single tooth, and the compressing devices, of the disk B, provided with the ratchet-teeth $a$ and the apertures $c\ c'$, substantially as and for the purpose set forth.

2. The combination of intermittently-rotated disk B, having apertures $c$, feed-hopper D, reciprocating plunger O, carrying dies $e$, the hinged trap S, and holding-cam I, substantially as shown and described, for operation as set forth.

3. The combination of apertured disk B, plunger O, carrying dies e, lever L, rod K, provided with adjustable roller k, and cam G, substantially as shown and described, for operation as specified.

4. The hinged trap S and its holding-cam, in combination with the apertured disk B, bed A, and compression devices, substantially as and for the purposes set forth.

5. In a compressing-machine, the combination, with the rotating disk B, having apertures e e', and the plunger O, provided with dies e at its lower end, of the rod f, having a tapering lower end, and moving with the plunger, substantially as shown and described, whereby the disk will be held stationary while the dies are compressing the material, as set forth.

CHARLES KILLGORE.

Witnesses:
CHAS. F. HURLBURT,
W. A. TEACHRET.